United States Patent [19]

Matsumoto et al.

[11] Patent Number: 5,046,380
[45] Date of Patent: Sep. 10, 1991

[54] THROTTLE CABLE FITTING STRUCTURE

[75] Inventors: Akio Matsumoto; Hidehiko Mishima; Tatsutoshi Mizobe, all of Hiroshima, Japan

[73] Assignee: Mazda Motor Corporation, Hiroshima, Japan

[21] Appl. No.: 426,954

[22] Filed: Oct. 26, 1989

[30] Foreign Application Priority Data

Oct. 26, 1988 [JP] Japan .................... 63-270062
Mar. 31, 1989 [JP] Japan .................. 1-37722[U]

[51] Int. Cl.⁵ .............................................. F16C 1/10
[52] U.S. Cl. .................... 74/502.4; 74/502.6
[58] Field of Search ............... 74/500.5, 502.4, 502.6, 74/473 R; 403/406.1, 405.1, 397

[56] References Cited

U.S. PATENT DOCUMENTS

| | | | |
|---|---|---|---|
| 4,366,725 | 1/1983 | Kondo | 74/502.4 |
| 4,552,032 | 11/1985 | Kanai | 74/473 R |
| 4,669,330 | 6/1987 | Stocker | 74/502.4 |
| 4,805,479 | 2/1989 | Brightwell | 74/500.5 X |
| 4,823,752 | 4/1989 | Uuskallio | 74/502.6 X |
| 4,875,384 | 10/1983 | Hirayama et al. | 74/502.4 |
| 4,889,006 | 12/1989 | Kolinske et al. | 74/502.4 |
| 4,895,041 | 1/1990 | Cunningham | 74/502.4 |
| 4,922,783 | 5/1990 | Wallace | 74/502.4 |

FOREIGN PATENT DOCUMENTS 55-30534  3/1980  Japan .

Primary Examiner—Vinh T. Luong
Attorney, Agent, or Firm—Fleit, Jaconson, Cohn, Price, Holman & Stern

[57] ABSTRACT

A throttle valve operating cam of an automatic transmission and an output control member of an automotive engine are interconnected so as to cooperate with each other by a cable consisting of an outer tube and an inner cable. The inner cable is connected to the throttle valve operating cam and the output control member and one end of the outer tube is connected first to the automatic transmission. The other end of the outer tube is regulated in position relative to a cable fitting member secured to the automotive engine and then fixed to the cable fitting member secured to the automotive engine.

6 Claims, 7 Drawing Sheets

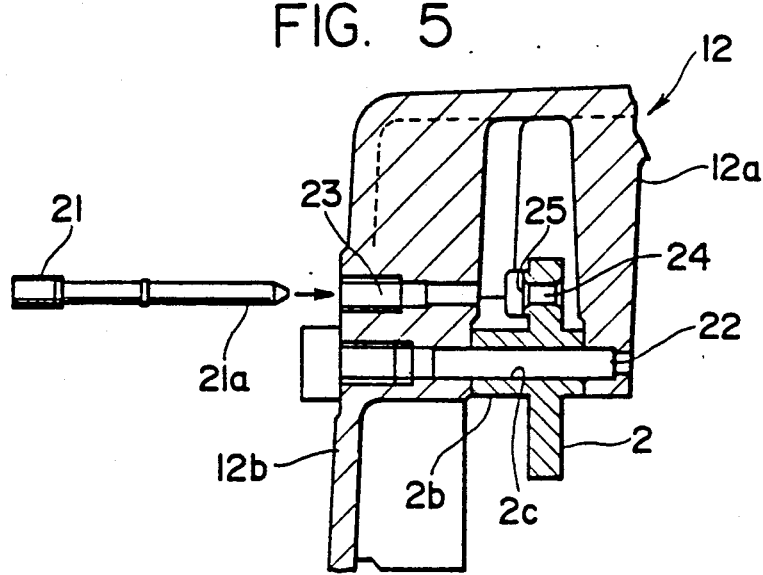
FIG. 5
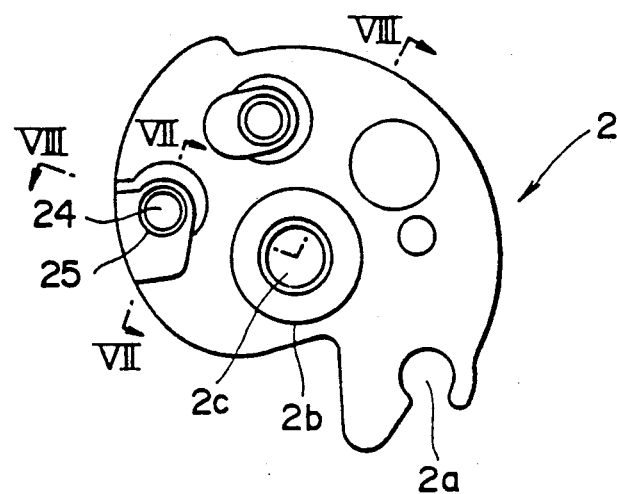
FIG. 6
FIG. 7
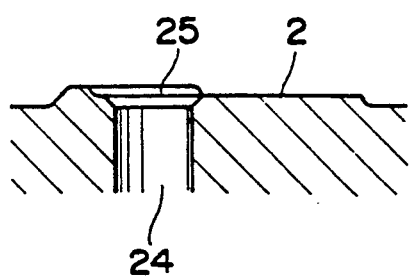
FIG. 8
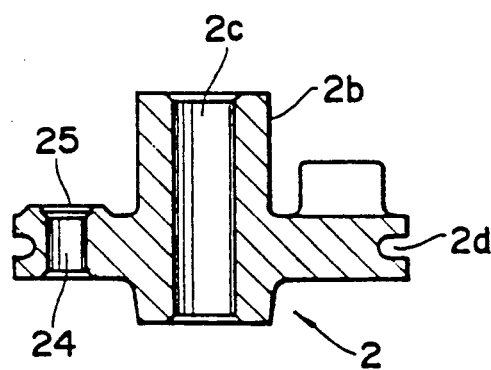

THROTTLE CABLE FITTING STRUCTURE

BACKGROUND OF THE INVENTION

1. Field of the Invention

The present invention relates to a method of fitting a throttle cable for interconnecting a throttle valve operating cam of an automatic transmission and a throttle valve of an automotive vehicle engine, and a structure for fitting the throttle cable to the automotive vehicle engine.

2. Description of Related Art

An automatic transmission for an automotive vehicle is typically provided with a throttle valve (which is hereinafter referred to as a transmission throttle valve) cooperating with a throttle valve of an engine (which is hereinafter referred to as an engine throttle valve). The automatic transmission requires a locking force for locking a transmission clutch which depends upon an engine output. If a high locking force is applied to the clutch, even though an engine output is low, a great shock is produced when the automatic transmission is shifted. To avoid such transmission shocks, it is preferred to make the difference between openings of the transmission throttle valve and the engine throttle valve is as small as possible.

In an attempt at avoiding such a transmission shock, an accelerator pedal and a throttle lever have been interconnected by means of a cable, and the throttle lever is connected to a throttle cam by another cable. These cables are arranged and fitted to the engine and automatic transmission. Such a cable arrangement is known from Japanese Unexamined Patent Publication No. 55(1980)-30,534.

To interconnect the throttle cam and the engine throttle lever by an inner cable extending through the inside of outer cable tube, after fitting a marking member to an inner cable near one end, opposite to the other end which has been connected to the throttle cam of the automatic transmission, the transmission throttle cam is turned by back-and-forth strokes between its two extremes, namely its fully closed and fully opened positions to measure distances between the marking member and a cable fitting bracket secured to the automotive engine. After coupling the automatic transmission to the automobile engine, the throttle cable is connected to the engine throttle lever at the other end in such a way that distances between the marking member and the cable fitting bracket agree with the measured distances when the engine throttle lever is operated so as to turn the transmission throttle cam between the fully closed and full open positions.

In the conventional arrangement, because the determination of the proper tension of the throttle cable is made by measuring the distance of the marking member from the cable fitting bracket, the actual tension applied to the throttle cable depends on the accuracy of measurement. Moreover, because the automotive vehicle engine and the automatic transmission have many parts attached thereto around locations where the throttle cable is fitted, it is, practically, difficult to measure the distance with a high accuracy. Additionally, because the arrangement of the throttle cable depends on not only the types of automotive vehicle engines but also on the automotive vehicle engines themselves, even when they are of the same type, it is necessary to provide various lengths of inner cables and outer cable tubes.

SUMMARY OF THE INVENTION

The primary object of the present invention is to provide a method of and a structure for easily arranging and fitting a throttle cable with a high accuracy.

The object of the present invention is achieved by providing a method of fitting a cable consisting of an outer cable tube and an inner cable extending through the inside of the outer cable tube, to an automotive vehicle engine with an automatic transmission. The cable interconnects a throttle cam for operating a throttle valve of an automatic transmission and an output control member of an automotive vehicle engine, so as to cause the throttle cam and output control member to cooperate with each other. One end of the outer cable tube is connected to a connecting member secured to the automatic transmission after connecting one end of the inner cable to the throttle cam and releasably fixing the throttle cam in a preselected position, such as a fully closed position or a fully open position. The other end of the inner cable is then connected to the output control member in such a way as to pull the inner cable relative to the outer cable tube so as to avoid slack of the inner cable between the other end of the inner cable and the other end of the outer cable tube. After positionally regulating the other end of the outer cable tube relative to a cable fitting means secured to the automotive vehicle engine, the other end of the outer cable tube is fitted to the cable fitting member secured to the automotive vehicle engine.

The cable fitting means by which the cable is fitted to the automotive vehicle engine comprises a cable fitting bracket secured to the housing of the automotive vehicle engine, a bracing means consisting of an elastically deformable bracing member and a mounting member attached to the cable fitting bracket. The bracing means is deformed by a force applied thereto in a direction perpendicular to the throttle cable to firmly grasp the other end of the outer cable tube. The bracing means further consists of a tension member disposed between the elastically deformable bracing member and the outer cable tube so as to apply a predetermined tension force between the outer cable tube and the inner cable, thereby avoiding slack in the inner cable.

BRIEF DESCRIPTION OF THE DRAWINGS

Still other objects of the invention and more specific features will become apparent to those skilled in the art from the following description of the preferred embodiments when considered together with the accompanying drawings, wherein like reference characters have been used in the different figures to denote the same parts, and in which:

FIG. 5 is a cross-sectional view of FIG. 2 taken along line V—V;

FIG. 6 is a front view of a throttle cam;

FIG. 7 is a cross-sectional view of FIG. 6 taken along line VII—VII;

FIG. 8 is a cross-sectional view of FIG. 6 taken along line VIII—VIII;

DESCRIPTION OF THE PREFERRED EMBODIMENTS

Figure 1:
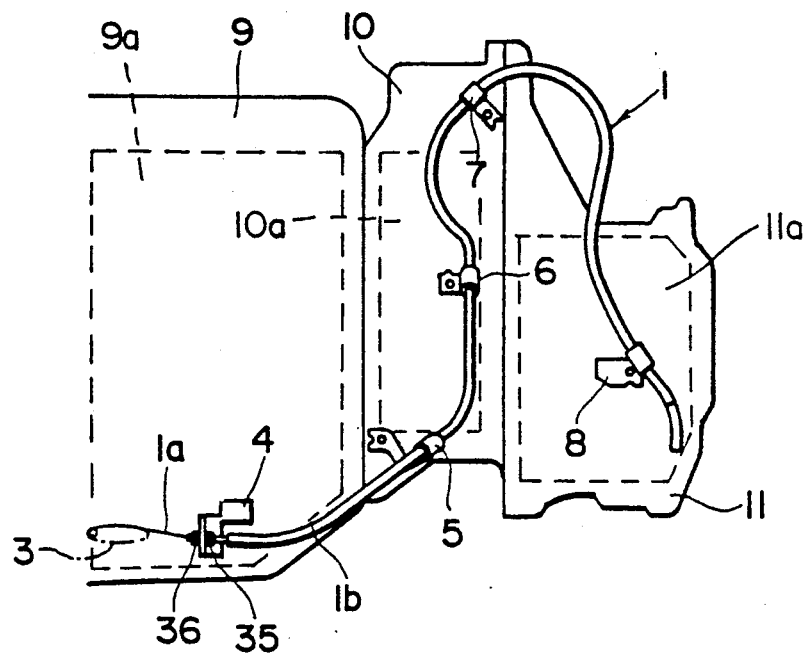
FIG. 1 is a plan view of a power unit in accordance with a preferred embodiment of the present invention.
Figure 2:
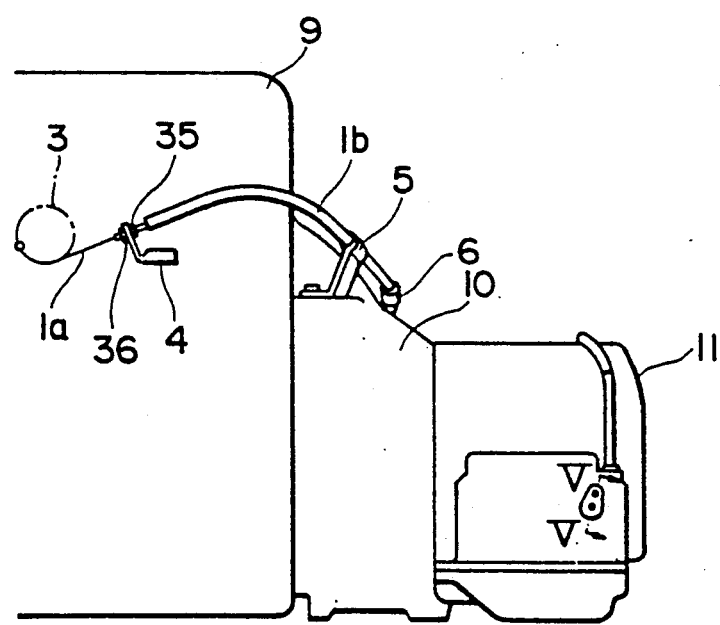
FIG. 2 is a side view of the power unit shown in FIG. 1.

Referring to the drawings in detail, and particularly to FIGS. 1 to 4, a structure including an engine body housing 9 attached with an automatic transmission housing 11 through a torque converter 10 is shown. Engine body housing 9 houses an automotive vehicle engine 9a, torque converter housing 10 houses a torque converter 10a, and automatic transmission housing 11 houses an automatic transmission 11a. A throttle lever 3 of the engine and a throttle cam 2 of the automatic transmission are interconnected by means of a throttle cable 1, comprising a flexible inner cable 1a and a flexible outer cable tube 1b. The outer cable tube 1b is secured to the outer surfaces of the engine body housing 9, the torque converter housing 10 and the automatic transmission housing 11 by means of a cable fitting bracket 4 and a plurality of, for example, four, in this embodiment, cable clips 5–8.

Figure 3:
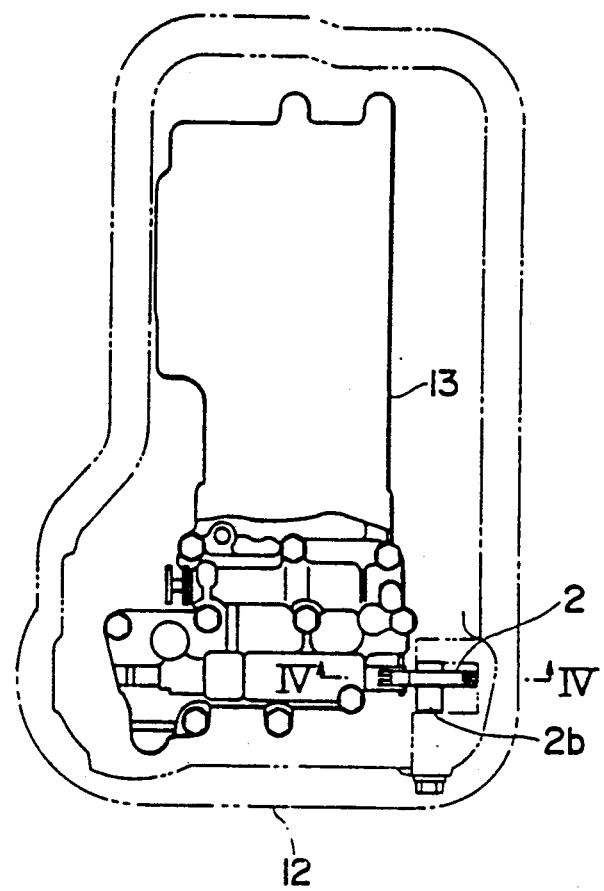
FIG. 3 is a plan view of a control valve.
Figure 4:
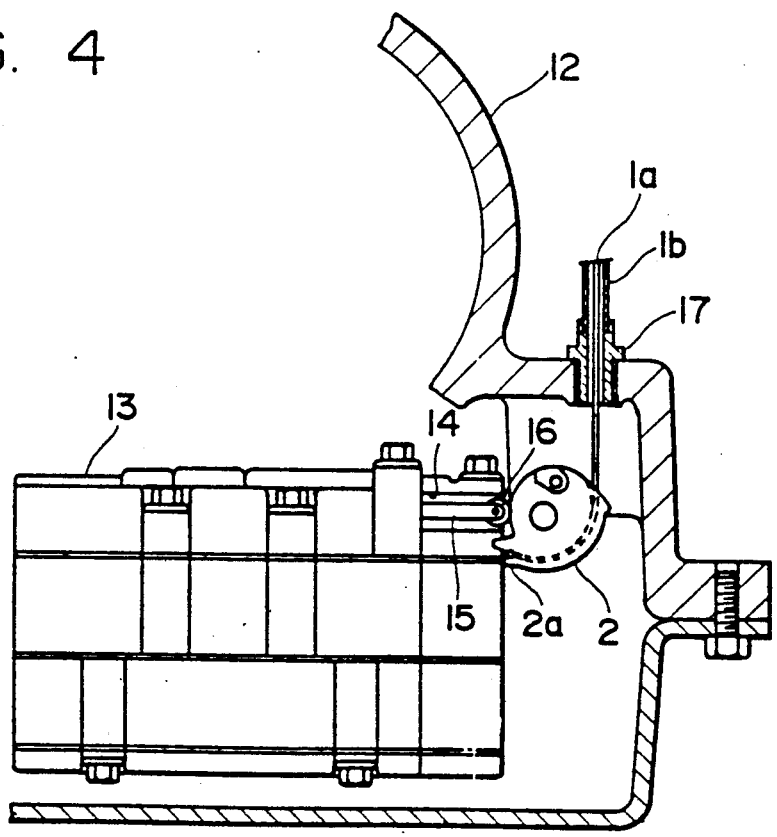
FIG. 4 is a cross-sectional view of FIG. 3 taken along line IV—IV.

As shown in FIGS. 3 and 4, the throttle cam 2 of the automatic transmission is in contact with a roller 16 rotatably attached to a top of a spool 15 protruding from a valve body 13 installed in a transmission case 12, which forms part of transmission 11a, and guided by a guide member 14. The throttle cam 2 serves to control a transmission throttle valve (not shown). The throttle cam 2 is formed with an annular groove 2d (see FIG. 8) in its periphery for receiving therein the inner cable 1a of the throttle cable 1. The outer cable tube 1b of the throttle cable 1 is secured at its one end to a connecting sleeve 17 fixedly attached to the transmission case 12. The inner cable 1a passes through the connecting sleeve 17 and extends inside the transmission case 12. One end of the inner cable 1a of the throttle cable 1 is secured to the throttle cam 2 by means of a retaining recess 2a formed in the throttle cam 2.

Before attaching the throttle cable 1, it is made certain that the throttle cam 2 is temporarily fixed in a preselected position, such as one of its extremes, i.e., a fully closed position or a fully open position, by means of a throttle cam fixing pin 21. To releasably fix the throttle cam 2 either in the fully closed position or in the fully open position, the throttle cam position fixing pin 21 is effectively used. That is, the throttle cam 2 is, as shown in FIG. 5, provided with a shaft 22 fixedly fitted in a bore 2c formed in a boss 2b thereof. The shaft 22 is rotatably supported by and between inner and outer walls 12a and 12b of the transmission case 12. The outer wall 12b of the transmission case 12 is formed with a guide bore 23 in parallel with the axial centerline of the shaft 22. The throttle cam fixing pin 21 is inserted through the guide bore 23 and penetrates it to fit its conical tip end 21a into a positioning hole 24 formed in the throttle cam 2. For easily fitting the conical tip end 21a of the throttle cam fixing pin 21, one end of the positioning hole 24 facing the outer wall 12b is tapered as illustrated in FIGS. 6-8 and indicated by a reference numeral 25. The throttle cam fixing pin 21 is inserted to snugly fit the conical tip end 21a of the throttle cam fixing pin 21 in the positioning hole 24 of the throttle cam 2, thereby fixing the throttle cam 2 in the preselected position.

Figure 9:
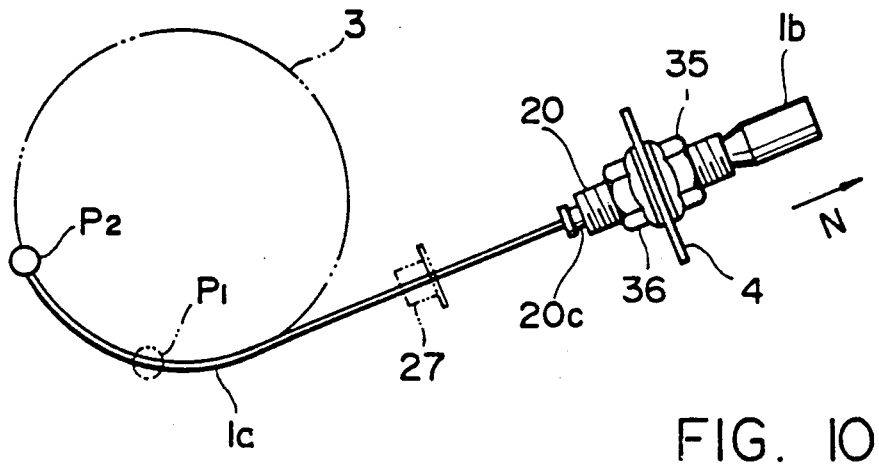
FIG. 9 is a view partly showing a throttle cable fitted to a cable fitting bracket.
Figure 10:
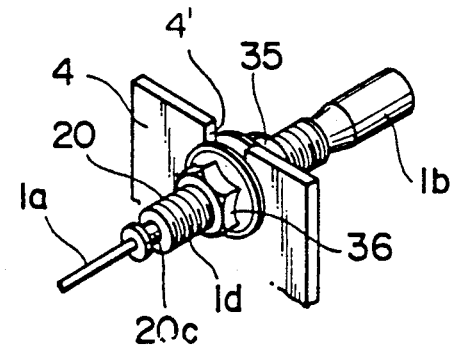
FIG. 10 is a perspective view showing the cable fitting bracket and a outer cable of the throttle cable.
Figure 11:
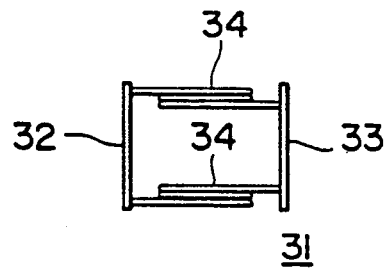
FIG. 11 is a plan view of a tension regulation member.
Figure 12:
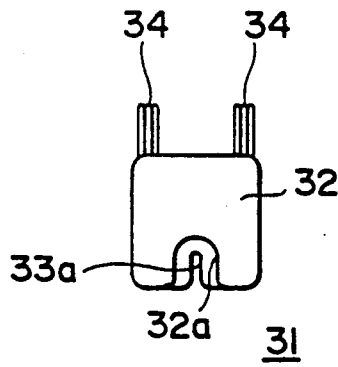
FIG. 12 is a left side view of the tension regulation member shown in FIG. 11.
Figure 13:
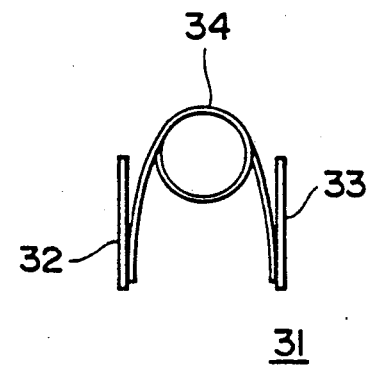
FIG. 13 is a front view of the tension regulation member shown in FIG. 11.
Figure 14:
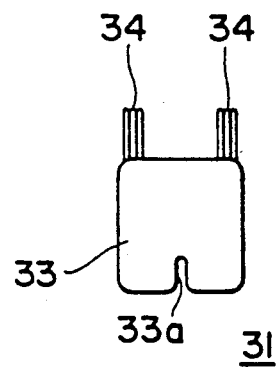
FIG. 14 is a right side view of the tension regulation member shown in FIG. 11.
Figure 15:
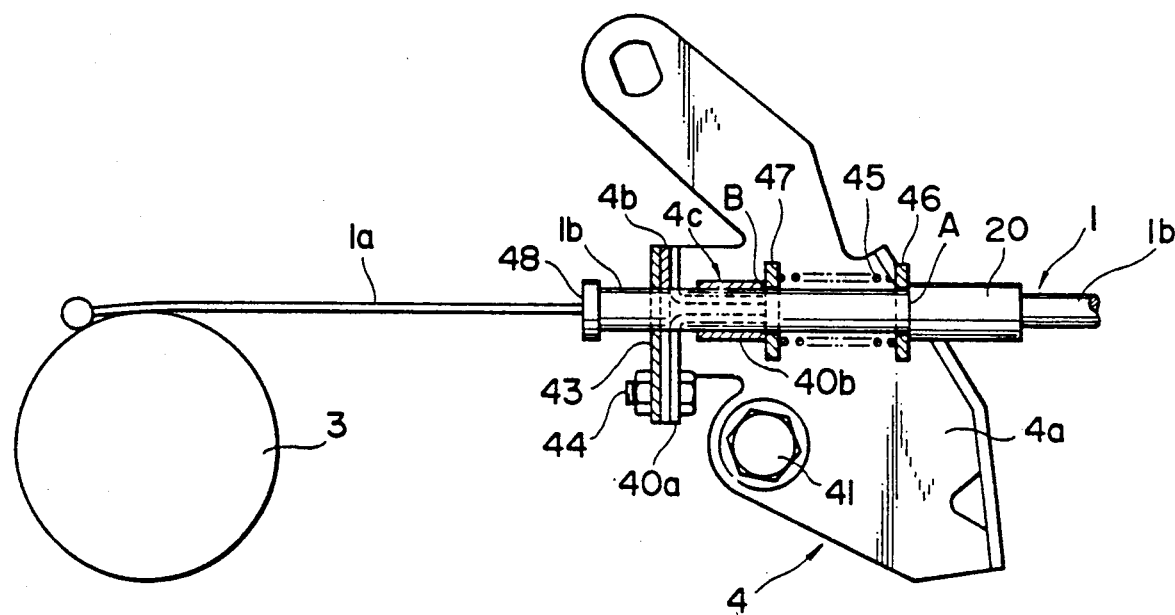
FIG. 15 is a front view of a cable fitting bracket in accordance with another preferred embodiment of the present invention.
Figure 16:
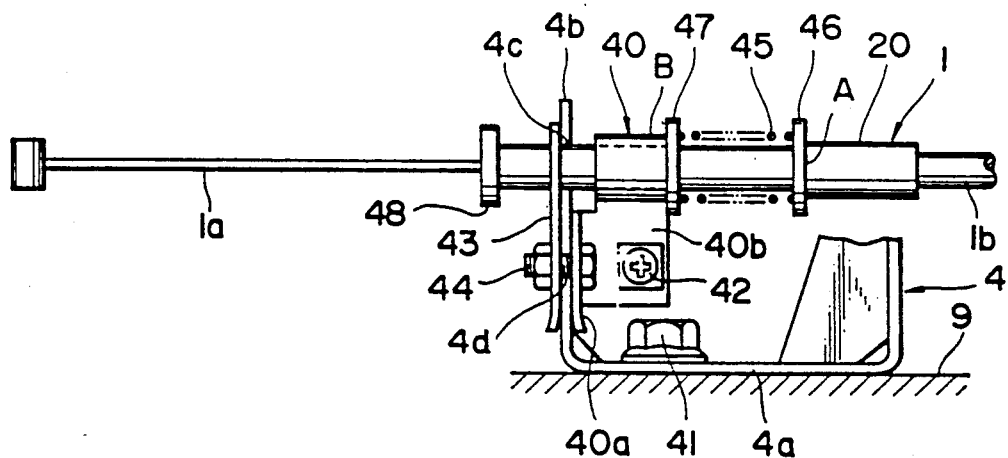
FIG. 16 is a bottom view of the cable fitting bracket shown in FIG. 15.
Figure 17:
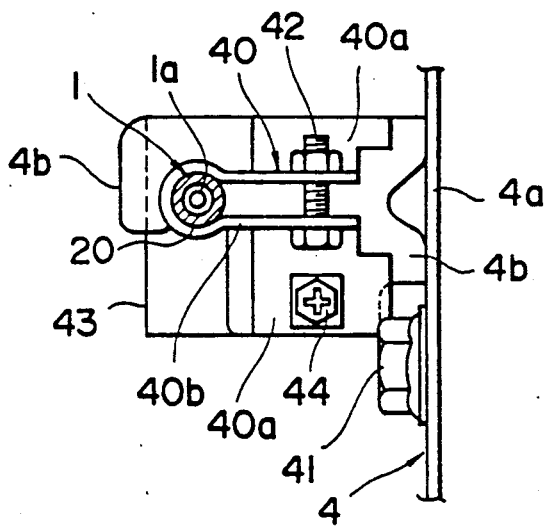
FIG. 17 is a side view, partially in section, of the cable fitting bracket shown in FIG. 15.
Figure 18:
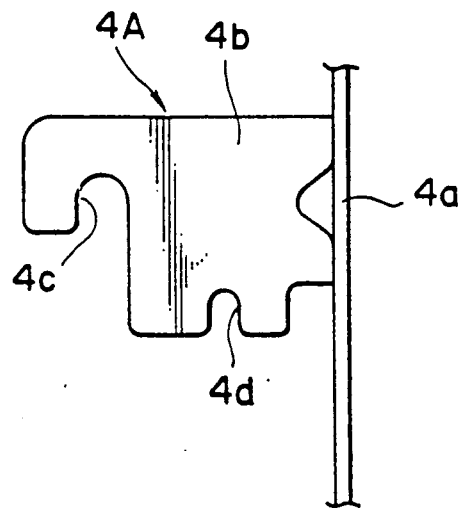
FIG. 18 is a side view of a bracket member of the cable fitting bracket shown in FIG. 15.

After having made certain that the throttle cam 2 is in the preselected position, the other end of the inner cable 1a is attached to the throttle lever 3 of the engine housing 9, and then the other end of the outer cable tube 1b is attached to the cable fitting bracket 4, secured or bolted to the engine housing 9 as shown in FIG. 9. As is clearly shown in FIG. 10, a connecting sleeve 20 formed with external threads 1d is secured to the other end of the outer cable tube 1b and attached with two fastening nuts 35 and 36 screwed thereon. The end of the outer cable tube 1b is connected to the cable fitting bracket 4 by putting part of the connecting sleeve 20 between the fastening nuts 35 and 36 in a bracket slot 4' of the cable fitting bracket 4. Thereafter, the throttle lever 3 is turned by pulling the outer cable 1b until the throttle lever 3 abuts against a stopper (not shown) where it brings the engine throttle valve into its idle position and the other end of the inner cable 1a is in a position $P_1$ shown in FIG. 9. Then, a tension clip 31, which will be described in detail later with reference to FIGS. 11 to 14, is attached to the cable 1 between the cable fitting bracket 4 and a nipple 27 securely attached to the inner cable 1a of the throttle cable tube 1, thereby tensioning the outer cable tube 1b to such a degree that the inner cable 1a does not elastically deform so as to pull the outer cable tube 1b and avoid a slack of the outer cable tube 1b.

The expansion clip 31, which is shown by way of example in FIGS. 11-14, comprises a pair of side plates 32 and 33 and a pair of tension springs 34 connecting the side plates 32 and 33 to each other. The side plates 32 and 33 are formed with a wide clip slot 32a snugly fitable on an annular groove 20c formed in the outer periphery of one end portion of the outer cable tube 1b and a narrow clip slot 33a firmly fitable on the inner cable 1a, respectively.

In the preparatory condition in which the throttle lever 3 is fully opened, the outer cable tube 1b is attached to the cable fitting bracket 4 and the expansion clip 31 is attached to the throttle cable 1, the outer cable tube 1b is pulled in a direction indicated by an arrow N in FIG. 9 and the fastening nut 35 on one side of the cable fitting bracket 4 opposite to the throttle lever 3 is fastened lightly until it comes into contact with the cable fitting bracket 4. At this time, special attention should be given to the following points:

(1) The connecting sleeve 20 should be in contact with the bottom of the bracket slot 4' of the cable fitting bracket 4;

(2) The outer cable tube 1b should be positioned perpendicularly to the cable fitting bracket 4; and (3) The inner cable 1a should have no slack, but should have a tension of no more than 0.5 Kgf between a point connected to the throttle lever 3 and a point where the nipple 27 is attached.

After the ascertainment of the above noted points, the expansion clip 31 is removed and the fastening nut 36 is firmly fastened with a predetermined torque of about 1.2 to 1.7 Kgf, keeping the fastening nut 35 in contact with the cable fitting bracket 4 until it is brought into contact with the cable fitting bracket 4, thereby firmly fixing the end of the outer cable tube 1b to the cable fitting bracket 4.

After the fixing of the outer cable tube 1b, the fixing pin 21 is removed from the throttle cam 2 so as to loosen it. Then, the throttle lever 3 is turned with back-and-forth strokes between its two extremes, namely the fully closed position $P_1$ and the full open position $P_2$, in order to be certain that the inner cable 1a can smoothly transmit rotation between the throttle cam 2 and the throttle lever 3. When the inner cable 1a is tensioned and has no slack, a bolt (not shown) is screwed into the bore 23 of the transmission housing 12 with a predetermined torque of about 0.8 to 1.1 Kgf to plug it up. However, if the inner cable 1a slackens, after returning the throttle cam 2 to its fully closed position and fixing it there with the fixing pin 21, the above procedures are repeated so as to tension the inner cable 1a to avoid slack.

In this manner, the throttle cable 1 is arranged and fitted onto the surfaces of the engine housing 9, the torque converter housing 10 and the automatic transmission housing 11 with a considerably improved accuracy by controlling a tension provided thereto and a slack produced therein by the use of the expansion clip 31 more than by adjusting the length of the throttle cable 1.

Referring to FIGS. 15 to 18, the cable fitting bracket 4 in accordance with a preferred embodiment of the present invention is shown in detail, comprising a bracket base plate 4a and a connecting sleeve grasping brace 40. The bracket base plate 4a, which is secured to the housing 9 of the engine with a mounting bolt 41, is formed with a mounting wall 4b bent up at a right angle. As is shown in detail in FIGS. 17 and 18, the mounting wall 4b is formed with a wide bracket slot 4c and a narrow bracket slot 4d for receiving therein the connecting sleeve 20 and a mounting bolt 44 for attaching a mounting flange 40a of the connecting sleeve grasping brace 40.

The connecting sleeve grasping brace 40, which is made of an elastic plate, consists of an elastically deformable expansion clip 40b and the mounting flange 40a formed integrally with the expansion clip 40b. The expansion clip 40b has a sleeve like clipping portion which is variable in inner diameter by being deformed and leg portions extending from both sides of the sleeve like clipping portion. The mounting flange 40a, by which the connecting sleeve grasping brace 40 is attached to the mounting wall 4b with the mounting bolt 44, is at a right angle relative to and extends from one of the leg portions. The connecting sleeve 20 is firmly held by the sleeve like clipping portion by fastening the leg portions to each other with a fastening bolt 42. When mounting the connecting sleeve grasping brace 40 to the cable fitting bracket 4, it is preferred to apply a backing plate 43 to the back surface of the mounting wall 4b of the cable fitting bracket 4.

Annular stopper rings 46 and 47 are fitted on a reduced diameter portion of the connecting sleeve 20 and are pressed against one end B of the sleeve like clipping portion of the expansion clip 40b and a shoulder A of the connecting sleeve 20, respectively, by means of an expansion member, such as a helical spring 45 mounted on the reduced diameter portion of the connecting sleeve 20 between the annular stopper rings 46 and 47, thereby pushing the outer cable tube 1b towards the throttle cam 2 in the automatic transmission housing. The connecting sleeve 20 is formed with a flange 48 at one end thereof to prevent the connecting sleeve grasping brace 40 from slipping off from the connecting sleeve 20 before the connecting sleeve grasping brace 40 is firmly attached to the cable fitting bracket 4.

In arranging and fitting the throttle cable 1 by using the cable fitting bracket 4, one end of the inner cable 1a and one end of the outer cable tube 1b of the throttle cable 1 are, respectively, secured to the throttle am 2 in the automatic transmission housing and the the automatic transmission 11 in the same manner as described in the previous embodiment. Then, after mounting the annular stopper rings 46 and 47 and the helical spring 45 on the reduced portion of the connecting sleeve 20, the connecting sleeve 20 is inserted in and held by the sleeve like clipping portion of the connecting sleeve grasping brace 40. Thereafter, the backing plate 43 is loosely fastened to the mounting flange 40a of the expansion clip 40b with the mounting bolt 44.

After having secured the other end of the inner cable 1a of the throttle cable 1 to the throttle lever 3 in the engine housing 9, the connecting sleeve grasping brace 40 grasping the connecting sleeve 20 is attached to the mounting wall 4c of the bracket base plate 4a in such a way as to insert laterally the connecting sleeve 20 and the shank of the mounting bolt 44 into the bracket slots 4c and 4d, respectively. Then, the mounting bolt 44 is tightened, so as to firmly mount the connecting sleeve grasping brace 40 to the cable fitting bracket 4. The mounting flange 40a and the backing plate 43 are preferably formed with lower flared skirts for easy sliding fit on the mounting wall 42 upon attaching the connecting sleeve grasping brace 40 to the cable fitting bracket 4. As a result of attaching the connecting sleeve grasping brace 40 to the cable fitting bracket 4, the outer cable tube 1b is properly biased by the helical spring 45, so as to be prevented from slackening. As is apparent from the above description for the previous embodiment, the throttle cam 2 is kept in the preselected position, which is a fully closed position or a fully open position, by means of the throttle cam fixing pin 21. Finally, keeping the outer cable tube 1b properly tightened, the leg portions of the expansion clip 40b are tightly fastened with the fastening bolt 42 so as to firmly hold the outer cable tube 1b of the throttle cable 1 by the sleeve like clipping portion of the connecting sleeve grasping brace 40, thereby completely fitting the throttle cable 1 to the cable fitting bracket 4.

Figure 19:
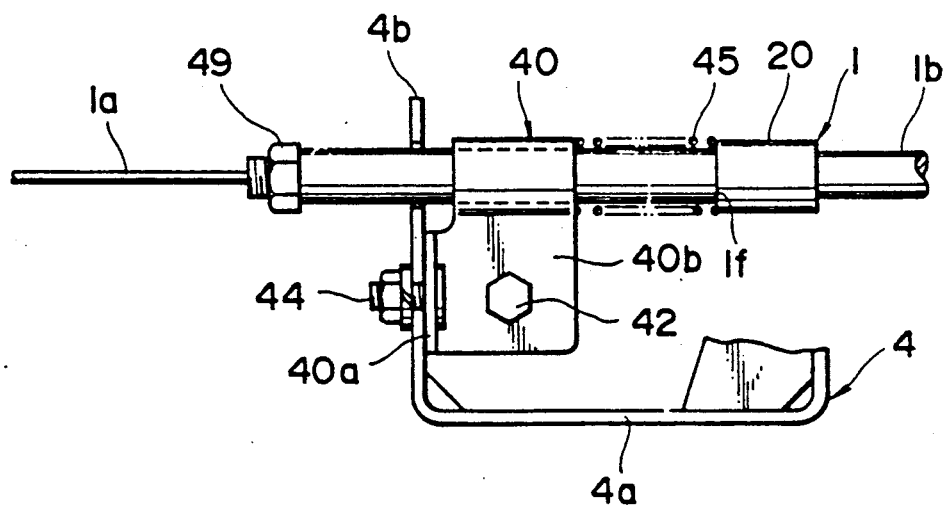
FIG. 19 is a bottom view of a cable fitting bracket in accordance with still another preferred embodiment of the present invention.

The connecting sleeve 20 used together with the cable fitting bracket 4 shown in FIGS. 15 to 18 may be varied as shown in FIG. 19. That is, the annular stopper rings 46 and 47 and the flange 48 formed at the end of the connecting sleeve 20 are omitted for the purpose of decreasing manufacturing cost. The helical spring 45 is mounted on the reduced diameter portion of the connecting sleeve 20 and held between the end of the sleeve like clipping portion of the expansion clip 40b' and a shoulder 1f of the connecting sleeve 20. In place of the flange 48, a nut 49 is screwed onto a threaded end of the connecting sleeve 20 so as to prevent the connecting sleeve grasping brace 40 from slipping off before attaching it to the cable fitting bracket 4.

Figure 20:
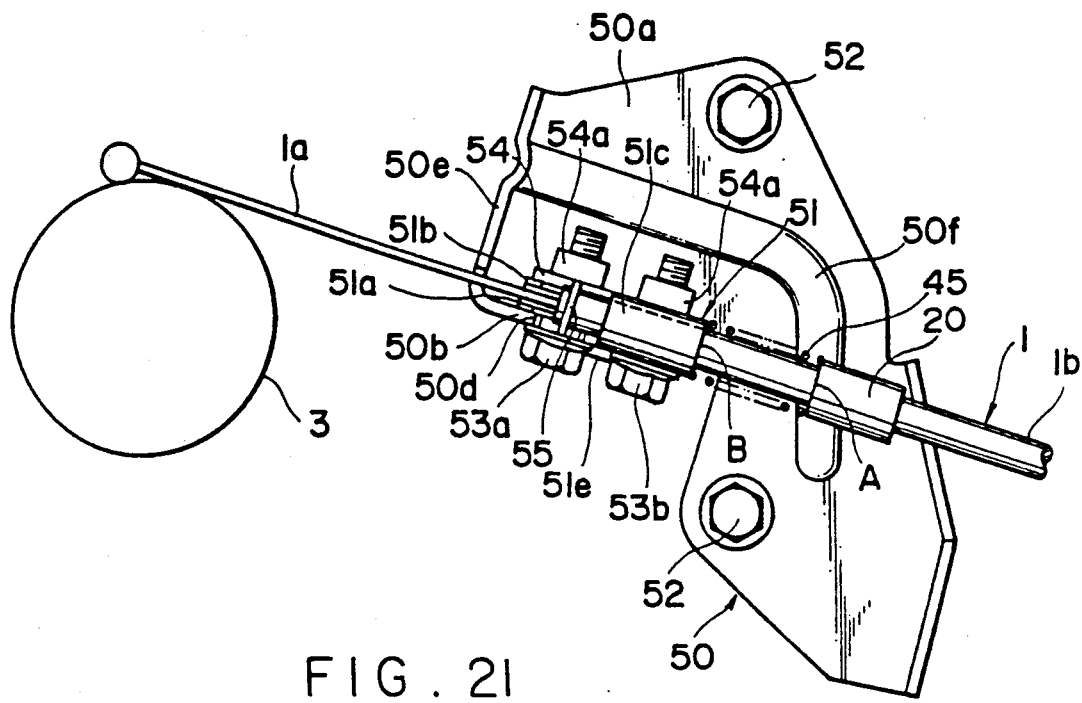
FIG. 20 is a front view of a cable fitting bracket in accordance with a further preferred embodiment of the present invention.
Figure 21:
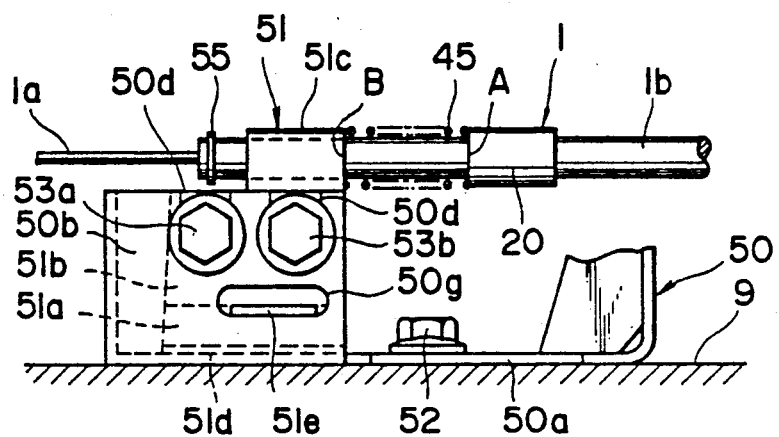
FIG. 21 is a bottom view of the cable fitting bracket shown in FIG. 20.
Figure 22:
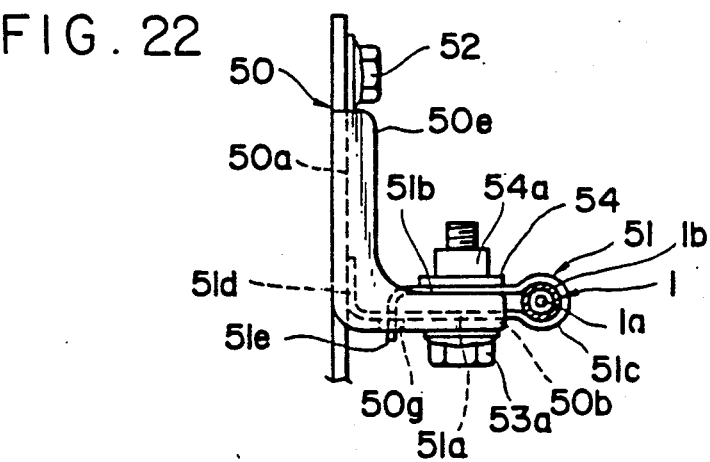
FIG. 22 is a side view, partly in section, of the cable fitting bracket shown in FIG. 20.

Referring to FIGS. 20 to 22, a cable fitting bracket 50 in accordance with another preferred embodiment of the present invention is shown in detail, comprising a bracket base plate 50a and a connecting sleeve grasping brace 51. The bracket base plate 50a, which is secured to the housing 9 of the engine with a mounting bolt 52, is formed with a mounting wall 50b bent up at a right angle. As is shown in FIG. 21, the mounting wall 50b is formed with two mounting slots 50d for receiving therein mounting bolts 53a and 53b for attaching the connecting sleeve grasping brace 51. Integrally formed with the bracket base plate 50a is a reinforcing rib 50e extending between rear ends of the bracket base plate 50a and the mounting wall 50b. The bracket base plate 50a is formed with a substantially L-shaped bead 50f for reinforcement.

The connecting sleeve grasping brace 51, which is made of an elastic plate, consists of a sleeve like clipping portion 51c and mounting plates 51a and 51b integrally formed with the sleeve like clipping portion 51c. The inner diameter of the sleeve like clipping portion 51c is decreased by depressing the mounting plates 51a and 51b against each other in a direction substantially at a right angle with respect to the outer surfaces of the mounting plates 51a and 51b. The mounting plates 51a and 51b of the connecting sleeve grasping brace 51 are fastened to the mounting wall 50b of the cable fitting bracket 50 with the mounting bolts 53a and 53b, thereby firmly grasping the connecting sleeve 20 by the sleeve like clipping portion 51c simultaneously with firmly mounting the connecting sleeve grasping brace 51 to the cable fitting bracket 50. The mounting bolts 53a and 53b are screwed into nuts 54a integrally provided with a backing plate 54. One of the mounting plates 51a and 51b, for example the mounting plate 51a, is provided with an integral lower plate extension 51d, bent laterally inwardly substantially at a right angle, which is laid on the upper surface of the bracket base plate 50a. The other mounting plate 51b, which is shorter in height than the mounting plate 51a, is provided with an integral lower projection 51e bent laterally outwardly substantially at a right angle which extends so as to penetrate through a slot formed in the one mounting plate 51a and engages a slot 50g formed in the mounting wall 50b of the cable fitting bracket 50.

An elastic expansion member, such as a helical tension spring 45, is mounted on a reduced diameter portion of the connecting sleeve 20 between a shoulder A of the connecting sleeve 20 and the end B of the sleeve like clipping portion 51c of the connecting sleeve grasping brace 51, thereby pushing the outer cable tube 1b towards the throttle cam 2 in the automatic transmission. The connecting sleeve 20 is fitted with an annular snap ring 55 near one end thereof to prevent the connecting sleeve grasping brace 51 from slipping off from the connecting sleeve 20 before the connecting sleeve grasping brace 51 is firmly attached to the cable fitting bracket 50.

In arranging and fitting the throttle cable 1 by using the cable fitting bracket 50 shown in FIGS. 20–22, after having slidably connected the connecting sleeve grasping brace 51 to one end of the outer cable tube 1b of the throttle cable 1 in such a way as to force the connecting sleeve grasping brace 51 toward the snap ring 55 and fastening loosely the mounting plates 51a and 51b with the fastening bolts 53a and 53b, one end of the inner cable 1a and one end of the outer cable tube 1b of the throttle cable 1 are, respectively, secured to the throttle cam 2 in the automatic transmission and the throttle valve 3 in the same manner as described in the previous embodiment. The connecting sleeve grasping brace 51 is connected to the mounting wall 50a of the cable fitting bracket 50 in such a way as to insert shanks of the mounting bolts 53a and 53b into the mounting slots 50d of the mounting wall 50b until the lower plate extension 51d of the mounting plate 51a of the connecting sleeve grasping brace 51 abuts against the surface of the bracket base plate 50a and the lower projection 51e of the mounting plate 51b of the connecting sleeve grasping brace 51 is engaged with the slot 50g of the mounting wall 50b of the cable fitting bracket 50.

After the ascertainment of the engagement between the lower projection 51e of the mounting plate 51b of the connecting sleeve grasping brace 51 with the slot 50g of the mounting wall 50b of the cable fitting bracket 50, when in fact the inner cable 1a is in tension sufficiently to avoid slack, the mounting bolt 53a is tightly fastened, first being kept at a right angle with respect to the throttle cable 1 while the lower plate extension 51d is depressed against the surface of the bracket base plate 50a of the cable fitting bracket 50. Then, the mounting bolt 53b is fastened, thereby firmly grasping the connecting sleeve 20 grasping the outer cable tube 1b by the sleeve like clipping portion 51c and, simultaneously, the connecting sleeve grasping brace 51 is fitted to the cable fitting bracket 50.

Because fixing of the connecting sleeve 20 to the connecting sleeve grasping brace 51 and fitting the connecting sleeve grasping brace 51 to the cable fitting bracket 50 are simultaneously effected by fastening bolts 53a and 53b, the cable fitting operation is considerably simplified. Because load is exerted on the mounting wall 50b of the cable fitting bracket 50 in a direction in parallel with the mounting plates 51a and 51b through the connecting sleeve grasping brace 51 when the throttle cable 1 acts, the cable fitting bracket 50 is improved in structural strength in comparison with those in the previous embodiments. Moreover, the engagement of the lower projection 51e of the mounting plate 51b of the connecting sleeve grasping brace 51 with the slot 50g of the mounting wall 50b makes it quite easy to ascertain that the connecting sleeve grasping brace 51 is accurately attached to the cable fitting bracket 50.

In any embodiment described above, the helical tension spring 45 as an expansion member, and may be provided either between the inner cable 1a and the cable fitting bracket 4, 50 or between the inner cable 1a and the outer cable tube 1b so as to tension the inner cable 1a.

It should be noted that various changes and modifications may be apparent to those skilled in the art which are within the scope of the invention. Such changes and modifications are intended to be covered by the following claims.

What is claimed is:

1. In combination, a cable for operationally coupling a throttle cam which operates a throttle valve of an automatic transmission and an output control member of an automotive vehicle engine, so as to cause said throttle cam and output control member to cooperate with each other, and a cable fitting means, said cable including an outer cable tube which is connected to a housing of said automatic transmission at one end and to a housing of said automotive vehicle engine at the other end by means of said cable fitting means, and an inner cable extending through the inside of said outer cable tube and connected between said throttle cam and said output control member, said cable fitting means comprising:

a cable fitting bracket secured to said housing of said automotive vehicle engine and having a base plate and a mounting wall bent upwardly substantially at a right angle relative to said base plate;

a connecting sleeve secured to said other end of said outer cable tube;

a brace, electively attachable to said mounting wall of said cable fitting bracket, said brace being adjustable to firmly grasp said connecting sleeve and securely attach said connecting sleeve to said cable fitting bracket; and a spring interposed between said brace and said connecting sleeve so as to apply a predetermined force between said outer cable tube and said inner cable to avoid slackening of said inner cable before said brace firmly grasps said connecting sleeve.

2. The combination as defined in claim 1, wherein said brace includes a sleeve like clipping portion for grasping an outer surface of said connecting sleeve, said spring being disposed between said sleeve like clipping portion and said connecting sleeve.

3. The combination as defined in claim 2, wherein said clipping portion includes leg portions extending from said sleeve like clipping portion, said leg portions being fastened to each other with a fastening bolt to deform said sleeve like clipping portion to reduce an inner diameter of said sleeve like clipping portion so that it tightly grasps said connecting sleeve.

4. The combination as defined in claim 3, wherein said sleeve like clipping portion is formed with an integral lower plate extension extending laterally therefrom, said extension abutting against said cable fitting bracket.

5. The combination as defined in claim 3, wherein said leg portions are fastened and attached to said mounting wall of said cable fitting bracket with said fastening bolt to deform said sleeve like clipping portion.

6. The combination as defined in claim 5, wherein one of said leg portions forms a lower extension bent laterally and substantially at a right angle and the other of said leg portions forms a a lower projection bent laterally in a direction opposite to a direction in which said lower extension is bent, and said mounting wall is formed with a slot with which said lower projection engages.

* * * * *